United States Patent
Shaw et al.

(10) Patent No.: US 10,318,629 B2
(45) Date of Patent: Jun. 11, 2019

(54) ADAPTIVE CONTENT RENDERING FOR OPTIMIZING PAGE LAYOUT

(71) Applicant: Microsoft Technology Licensing, LLC, Redmond, WA (US)

(72) Inventors: Steven Wei Shaw, Bellevue, WA (US); Jacek Ciereszko, Bellevue, WA (US); Michael Gerard McKay, Bellevue, WA (US); Ankit Goel, Redmond, WA (US); Nazuk Jain, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 15/800,706

(22) Filed: Nov. 1, 2017

(65) Prior Publication Data
US 2019/0130873 A1 May 2, 2019

(51) Int. Cl.
*G06F 17/25* (2006.01)
*G09G 5/14* (2006.01)
*G09G 5/00* (2006.01)

(52) U.S. Cl.
CPC ............ *G06F 17/25* (2013.01); *G09G 5/005* (2013.01); *G09G 5/14* (2013.01)

(58) Field of Classification Search
None
See application file for complete search history.

(56) References Cited

U.S. PATENT DOCUMENTS

| 7,272,789 | B2 * | 9/2007 | O'Brien | G06F 17/211 715/247 |
| 7,770,109 | B2 * | 8/2010 | Fortes | G06F 17/211 715/209 |
| 2002/0140982 | A1 * | 10/2002 | Nitta | G06F 17/211 358/1.18 |
| 2002/0165937 | A1 * | 11/2002 | Nitta | G06F 17/211 709/217 |
| 2010/0275152 | A1 * | 10/2010 | Atkins | G06F 17/212 715/788 |
| 2013/0305144 | A1 * | 11/2013 | Jackson | G06F 17/217 715/246 |
| 2014/0181646 | A1 * | 6/2014 | Rangwala | G06F 17/30719 715/252 |
| 2014/0250371 | A1 * | 9/2014 | Wabyick | G06F 17/21 715/243 |
| 2014/0258849 | A1 * | 9/2014 | Chung | G06F 17/212 715/243 |

(Continued)

*Primary Examiner* — David H Chu
(74) *Attorney, Agent, or Firm* — Arent Fox LLP (57) ABSTRACT

Examples described herein generally relate to a computer device including display, a memory, and at least one processor configured to render content modules to the display. The processor determines a display size of the display on which the content is to be rendered. The processor determines a priority of each of the multiple content modules. The processor determines, for each content module, display capabilities including one or more numbers of columns that the content module can span at the display size. The processor scores each layout of a first set of multiple layouts of the multiple content modules based on at least a priority, a number of columns, and unused space of the layout. The processor generates instructions for rendering the multiple content modules to the display at the display size according to the one layout of the multiple layouts with a best score.

20 Claims, 6 Drawing Sheets

(56) References Cited

U.S. PATENT DOCUMENTS

2014/0372874 A1\* 12/2014 Marseille .............. G06F 17/243
                                                      715/243
2018/0203826 A1\*  7/2018 Ansel ................... G06F 17/212
2018/0203832 A1\*  7/2018 Zhang ..................... G06F 17/24
2018/0218232 A1\*  8/2018 Tokuda ................... G06K 9/18

\* cited by examiner

ADAPTIVE CONTENT RENDERING FOR OPTIMIZING PAGE LAYOUT

BACKGROUND

The present disclosure relates to content display, and more particularly to adaptive rendering of content to a display based on a current display size.

Various computer applications present content to a user. Typically, a human designer determines a desired layout for the content. The layout is then encoded into a computer-readable form and processed by an end user computer device to present the content to the user.

The expanding use of different types of computer devices presents difficulty for content layout design because a layout designed for one type of device may not work well for another type of device. For example, a webpage designed for display on a desktop computer monitor may be difficult to view on a smaller mobile device. For example, if scaled to the smaller screen size, text may not be readable. A conventional approach for display on different devices is to generate a different layout for each type of device. For example, different templates may be designed for each type of device, and the human designer may fill the template with specific content.

Although the use of templates is effective for handling different types of displays, templates also increase the work necessary whenever new content is generated because the content needs to be manually adapted for each template. Further, templates may not always display correctly, for example, when a user changes a display area, some portions of the layout may not be visible or may not render correctly.

Thus, there is a need in the art for improvements in content rendering for computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The disclosure provides a computer device for rendering content including multiple content modules. The computer device may include a display, a memory, and at least one processor. The processor may determine a display size of the display on which the content is to be rendered. The processor may determine a priority of each of the multiple content modules. The processor may determine, for each content module, display capabilities including one or more numbers of columns that the content module can span at the display size. The processor may score each layout of a first set of multiple layouts of the multiple content modules. The score may be based on at least the priority of each of the content modules in the layout, a number of columns for each respective content module in the layout, and unused space of the layout. The processor may generate instructions for rendering the multiple content modules to the display at the display size according to the one layout of the multiple layouts with a best score.

The disclosure provides a method for rendering multiple content modules on a computer display. The method may include determining a display size on which the content is to be rendered. The method may include determining a priority of each of the multiple content modules. The method may include determining, for each content module, display capabilities including one or more numbers of columns that the content module can span at the display size. The method may include scoring each layout of a first set of multiple layouts of the multiple content modules. The score may be based on at least the priority of each of the content modules in the layout, a number of columns for each respective content module in the layout, and unused space of the layout. The method may include generating instructions for rendering the multiple content modules to the display at the display size according to the one layout of the multiple layouts with a best score.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for dynamically rendering content modules to a display having a display size. The methods disclosed herein may be utilized by different device types to display the same content modules on different displays in a manner that optimizes the content for the display size while having recognizable similarity to display of the content on other devices. Further, the methods may allow dynamic changes to a layout of the content modules in response to resizing of a display (e.g., in a window).

Generally described, the computer device may divide content rendering between a layout controller and the individual content modules. The layout controller may provide the content modules with information regarding the current display size. The content modules may provide capabilities for different rendering options for the current display size. For example, the content modules may indicate one or more numbers of columns that the display module can span. The layout controller may use the capabilities of the content modules to determine a layout that optimizes the content by minimizing empty space. The layout controller may then send each content module a rendering size. The content modules may then dynamically render the content to the display at the rendering size.

In an implementation, the layout controller determines the best layout by scoring multiple layouts. The layout controller may use a decision tree to generate a baseline layout. For example, the baseline layout may include the content modules in an order of priority and each content module may be allocated a preferred number of columns. The baseline layout may include unused space. The layout controller may score the baseline layout based on weights for the priority and preferred number of columns for each content module and the overall unused space. The layout controller may modify one or more properties of one or more content modules to determine alternative layouts. The layout with the best weighted score may be selected for rendering. In an implementation, lower scores are assigned for content modules allocated a preferred priority and/or number of columns. The layout may also be assigned a score based on the amount of unused space. The lowest score may be considered the best score. It should be appreciated that alternative scoring systems using the highest score as the best may also be used.

Figure 1:
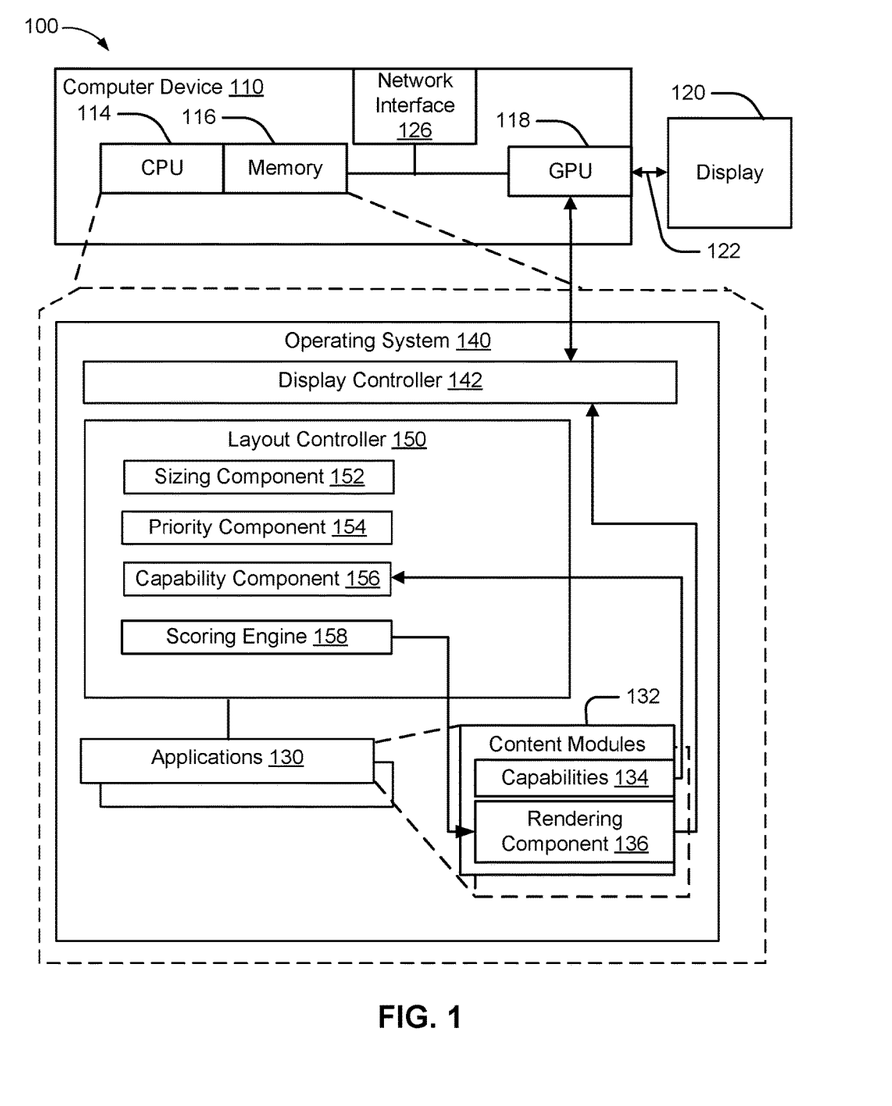
FIG. 1 is a diagram of an example computer system for displaying multiple content modules on a computer display in accordance with an implementation of the present disclosure.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device capable of generating a video-out signal.

The computer device 110 may include a central processing unit (CPU) 114 that executes instructions stored in memory 116. For example, the CPU 114 may execute an operating system 140 and one or more applications 130. The computer device 110 may also include a graphics processing unit (GPU) 118 for rendering an image for display on a display 120. For example, the display may present a user interface (UI) of the operating system 140 and/or the one or more applications 130.

The computer device 110 may include a display 120. The display 120 may be, for example, a computer monitor or a touch-screen. The display 120 may have a maximum display size. In an implementation, the display 120 may be subdivided into smaller portions. For example, a window may be a movable and resizable display area within the display 120. A window may have an adjustable display size.

The GPU 118 may include one or more processors and specialized hardware for image processing. In an implementation, the GPU 118 may be integrated with a CPU 114 on a motherboard of the computer device or may be a discrete chip. The GPU 118 may be connected to the display 120 via a display interface 122. The GPU 118 may periodically scan out an image from an image buffer to the display 120 via the display interface 122 according to a refresh rate of the display 120.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The operating system 140 may include a display controller 142 for controlling the GPU 118 to render an image for display on the display 120. For example, the display controller 142 may receive commands to render various objects. The display controller 142 may perform composition to determine which objects are to be rendered on the display 120. The display controller 142 may pass commands to the GPU 118 to render the selected objects.

The operating system 140 may include a layout controller 150 for determining a layout of one or more content modules 132 of an application 130. In an implementation, the layout controller 150 is a component of the operating system 140 that may be utilized by one or more applications 130 to generate a layout including multiple content modules 132. In another implementation, the layout controller 150 may be a component of an application 130 for generating a layout of content modules 132 specifically for the application 130. The layout controller 150 may include: a sizing component 152 for determining a display size for the application 130; a priority component 154 for determining a priority of each of the multiple content modules 132; a capability component 156 for determining, for each content module 132, display capabilities 134 including one or more numbers of columns that the content module can span at the display size; and a scoring engine 158 for scoring multiple layouts of the multiple content modules 132 based on at least the priority of each of the content modules, a number of columns for the respective content module for the layout, and unused space of the layout.

The sizing component 152 may include computer executable instructions for determining a display size for an application. In some implementations, the application may be displayed in a full screen mode, and the display size for the application may be the same as a display size of the display 120. The display size may also be based on the orientation of the display 120. For example, the display 120 may support by a landscape view and a portrait view, in which case the display size may be based on the current view. In some cases, display settings (e.g., resolution) may be dynamically altered to change the display size. In other implementations, the display size for an application 130 may be dynamically determined. For example, the application 130 may be displayed in a window having a current display size that can be adjusted, for example, by the user selecting a size button or dragging an edge of the window. In any case, the sizing component 152 may determine the current display size of the application.

The priority component 154 may include computer executable instructions for determining a priority of each of the multiple content modules 132. In an implementation, the priority of the multiple content modules 132 may be determined by the application 130, which may provide a list of the content modules along with the respective priority to the priority component 154. In another implementation, the priority of the content modules may be dynamic, for example, depending on the actual content to be displayed. The priority component 154 may communicate with the content modules 132 to determine a current priority of the content module. For example, a content module 132 may have a base priority that may be adjusted by one or more factors. For instance, in a retail application, a price content module may have a medium priority that may be increased if the item is on sale. As another example, a friends content module may have a reduced priority when no friends are currently using the application. If a content module 132 has no content to display, the content module 132 may indicate no priority, and the priority component 154 may remove the empty content module from the layout.

The capability component 156 may include computer executable code for determining, for each content module 132, display capabilities including one or more numbers of columns that the content module can span at the display size. The capabilities of the content module 132 may depend on the type of content to be displayed. For example, a content module that displays an image may only be capable of display in a specific number of columns in order to maintain an aspect ratio of the image. As another example, a content module 132 that displays text may be resizable to any number of columns. A content module 132 may include sub-modules that may be arranged differently depending on the number of columns spanned by the content module 132. For example, a content module 132 for displaying a list having paired icons and text may display the list in any even number of columns. Each content module 132 may indicate a preferred number of columns as well as other numbers of columns the content module is capable of spanning.

The scoring engine 158 may include computer executable code for scoring multiple layouts of multiple content modules based on at least the priority of each of the content modules, a number of columns for the respective content module for the layout, and unused space of the layout. The scoring engine 158 may determine the multiple layouts based on feasible combinations of the content modules 132. Feasible combinations may satisfy certain criteria such as no content module being wider than the number of columns. For example, the scoring engine 158 may determine one or more orders for the content modules based on the priority of the content modules. Multiple potential orders may occur when two or more content modules have similar priority and the scoring engine 158 is free to change the order of the content modules. The scoring engine 158 may determine a baseline layout by placing each module in order in a grid of rows and columns according to a preferred number of columns for the display size. The scoring engine 158 may generate alternative layouts by changing the preferred number of columns for a content module to another number of columns the content module is capable of spanning. The scoring engine 158 may generate a score for each layout. In an implementation, each content module may provide a score based on the number of columns allocated to the content module in the layout. The content module scores may be weighted according to the priority. The score may also include a score based on the amount of empty space in the layout. Empty space in rows toward the top of the layout may have a greater weight than empty space in rows toward the bottom of the layout. In an implementation, a lower score may be assigned to a layout with less empty space. A lower score may be considered a better score. The layout with the lowest score may be considered the one layout having the best score to be rendered to the display 120. The scoring engine 158 may select the layout having the b score. In an implementation, a decision tree may be used to select possible layouts. If a modification to a layout produces a worse score than a baseline layout, further possible layouts along that branch of the decision tree (i.e., layouts including the modification) may not be scored. The scoring engine 158 may follow a different path of the decision tree by modifying another content module 132.

A content module 132 may include executable code for generating content to be rendered on the display 120. For example, a content module 132 may be a process, application, thread, function, or object that generates instructions for rendering content. Content may include any graphic that can be displayed on the display 120. Further, the content may be interactive and the content module 132 may respond when the user interacts with the content. For example, a content module may include content elements such as images, test, hypertext, buttons, sliders, or other graphical user interface elements. Each content module 132 may include capabilities 134 and a rendering component 136. The capabilities 134 may indicate one or more numbers of columns that the content module can span. For example, a content module may require at least two columns but may be expanded to any even number of columns. The capabilities 134 may provide the numbers of columns in a preferred order. For example, a content module may prefer a maximum number of columns, but may be resized to a smaller number of columns if necessary.

The rendering component 136 may generate instructions for rendering the content module. The rendering component 136 may receive a content size and position in the selected layout. The rendering component 136 may then generate commands for rendering the content in the designated space and send the commands to the display controller 142.

Figure 2:
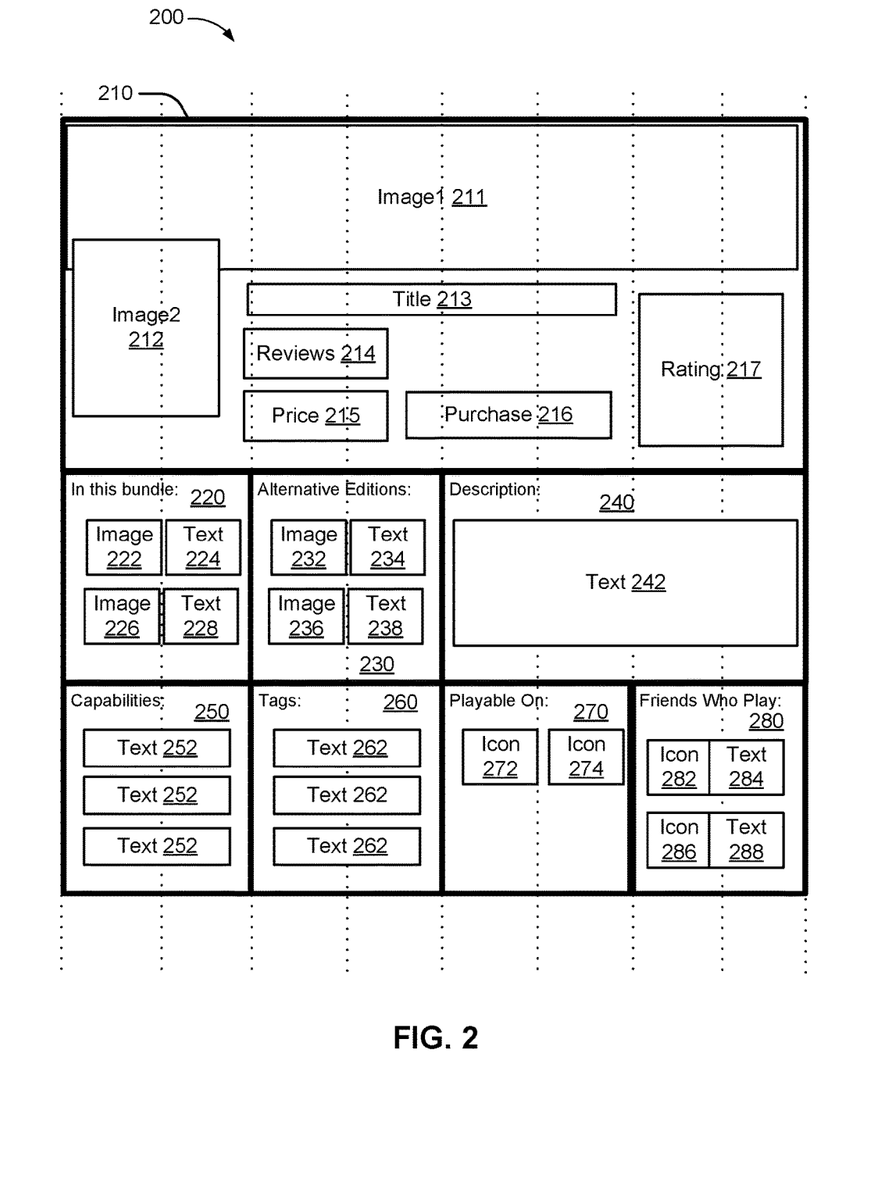
FIG. 2 is a diagram of an example layout including multiple content modules in accordance with an implementation of the present disclosure.

Referring now to FIG. 2, the layout 200 is an example layout that may be used for a retail application for digital products. Although a retail application for digital products is used as an example, it should be appreciated that other types of content may be displayed using the techniques disclosed herein. As illustrated the layout 200 may include eight content modules 210, 220, 230, 240, 250, 260, 270, 280. The content modules may be arranged on a grid including eight columns and three rows. For example, the vertical dotted lines 202 may divide the columns and the horizontal dotted lines 204 may divide the rows. The dotted lines 202, 204 may not be visible in the rendered layout 200. For example, based on a display area, the sizing component 152 may determine that eight columns should be used. The number of rows may be increased to accommodate all of the content modules.

The content module 210 may be a compound content module including multiple content elements. For example, the content module 210 may include a first image 211, a second image 212, a title 213, reviews 214, price 215, a purchase button 216, and a rating 217. The content module 210 may include logic that determines which display elements to display and in which locations depending on the number of columns spanned. For example, the content module 210 may use a template to modify the display of the content elements based on the width of the render area allocated to the content module 210.

The content module 220 may identify other digital products included in a bundle. For example, the content module 220 may present the other products as an image 222 and text 224. For instance, a first product may be arranged in a first row within the content module 220 and a second product represented by image 226 and text 228 may be arranged in a second row.

The content module 230 may identify alternative digital products. For example, the content module 220 may present the alternative products as an image 232 and text 234. For instance, a first product may be arranged in a first row within the content module 230 and a second product represented by image 236 and text 238 may be arranged in a second row.

The content module 240 may be a description that includes a relatively large text field 242.

The content module 250 may list capabilities of the digital product (e.g., multiplayer modes). Each capability may be displayed as a text field 252.

The content module 260 may list various tags associated with the digital product. For example, each tag may be displayed as a text field 262.

The content module 270 may indicate types of devices on which the digital product may be used. For example, the types of devices may be personal computers (PC), mobile devices, console, tablet, or other classifications of computer devices. Each type of device may be represented by an icon 272. The icon associated with type of device of the computer device 110 being used may be indicated, for example, by a circle around the icon.

The content module 280 may indicate friends who use the digital product. For example, each friend may be represented by an icon 282 (e.g., an avatar) and text 284. For instance the friends may be displayed in rows.

Figure 3:
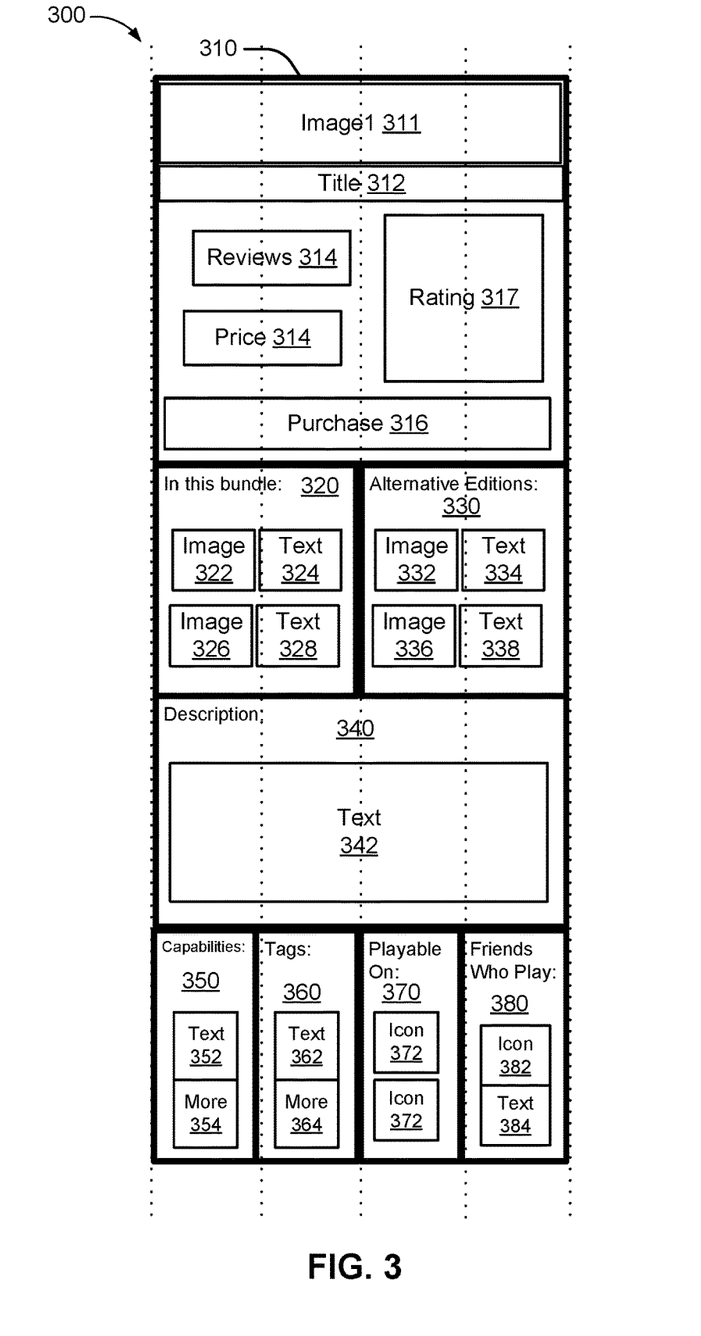
FIG. 3 is a diagram of another example layout including the multiple content modules of FIG. 2 with a different display size in accordance with an implementation of the present disclosure.

Referring now to FIG. 3, the layout 300 is another example layout that may be used for a retail application for digital products. The layout 300 may include eight content modules 310, 320, 330, 340, 350, 360, 370, 380 corresponding to the content modules 210, 220, 230, 240, 250, 260, 270, 280 in FIG. 2. The content modules 310, 320, 330, 340, 350, 360, 370, 380 may be arranged on a grid including four columns and four rows. For example, the vertical dotted lines 302 may divide the columns and the horizontal dotted lines 304 may divide the rows. The dotted lines 302, 304 may not be visible in the rendered layout 300. For example, based on a display area, the sizing component 152 may determine that four columns should be used. The number of rows may be increased to accommodate all of the content modules. Further, the height of the rows may be variable depending on the content modules 132 or the content thereof. In an implementation, the layout 300 may be used to display the same content modules 132 as the layout 200, for example, on two different devices having two different display sizes. Alternatively, the layout 200 and the layout 300 may be used to display the same content modules 132 on the same device, for example, when a user resizes a window to change the display size for the application 130. Since the rendering size of each content module 132 may change depending on the layout, the content displayed by each content module 132 may differ between the layout 200 and the layout 300.

The layout controller 150 and the content modules 132 may adjust for the change in the display size. For example, the layout controller 150 may determine a rendering size for each content module based on the capabilities of each content module. For example, the content module 210 may be changed from a width of 8 columns to a width of 4 columns. In contrast, the content modules 220, 230, and 240 may remain at their original widths of 2 columns, 2 columns, and 4 columns, respectively. As another example, the content modules 250, 260, 270, 280 may each be reduced to 1 column width. The layout controller 150 may also rearrange the positions of the content modules. For example, instead of being in the same row as the content modules 220 and 230, the content module 240 may be moved to a separate row. The layout controller 150 may provide each of the content modules 310, 320, 330, 340, 350, 360, 370, 380 with the updated rendering size and positions.

The content modules 310, 320, 330, 340, 350, 360, 370, 380 may change the content rendered based on the display area. For example, the content module 310 may change the size of the first image 311, remove the second image 212 (FIG. 2), and reposition the title 313, review 314, price 315, purchase button 316 and rating 317. The content modules 320, 330, and 340 may have the same rendering area as the corresponding content modules in layout 200 and may render the same content (e.g., images 322, 326, 332, 336 and text 324, 328, 334, 338) in the new positions. The content modules 350 and 360 may be allocated a smaller rendering area and may render fewer elements. For example, the content modules 350 and 360 may render a single text field 352, 362, respectively. The content modules 350 and 360 may include a "more" button 354, 364 to expand the respective content module if requested. The content module 370 may include the icons 372, but may arrange the icons 372 vertically instead of in a row. Similarly, the content module 280 may arrange the icon 382 and text 3384 vertically.

Figure 4:
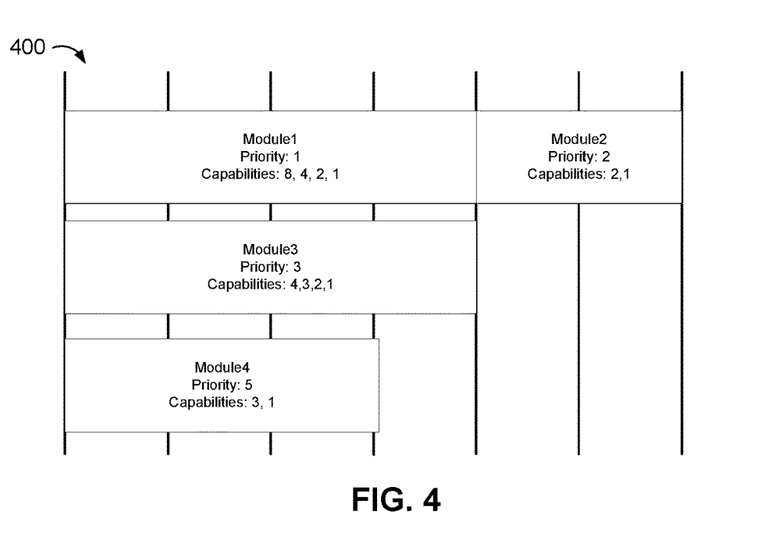
FIG. 4 is a diagram of a baseline layout of content modules in accordance with an implementation of the present disclosure.
Figure 5:
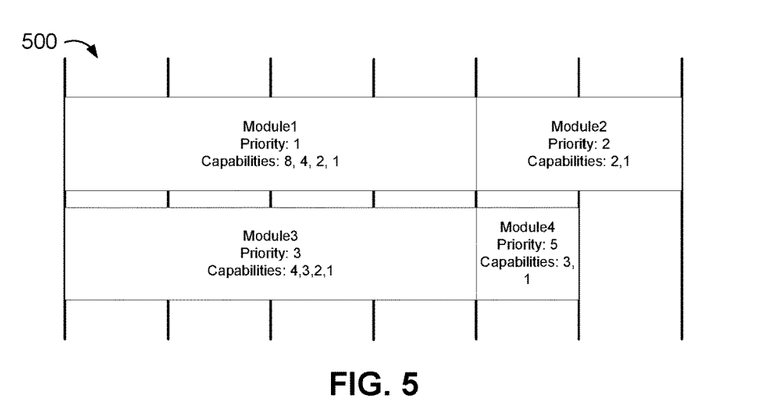
FIG. 5 is a diagram of a first alternative layout of the content modules of FIG. 4 in accordance with an implementation of the present disclosure.
Figure 6:
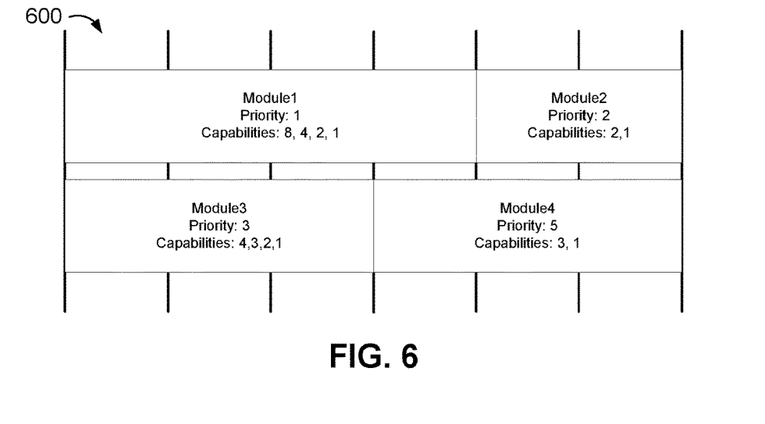
FIG. 6 is a diagram of a second alternative layout of the content modules of FIG. 4 in accordance with an implementation of the present disclosure.

Referring now to FIGS. 4-6, an example technique for scoring layouts is described. For example, the scoring engine 258 may determine a score for each of the potential layouts 400, 500, 600. For each of the potential layouts 400, 500, 600, the sizing component 152 may determine that 6 columns should be used to display 4 content modules 410, 420, 430, 440. The first content module 410 may have a priority of 1 and be capable of display in 8, 4, 2, or 1 columns. The second content module 420 may have a priority of 2 and be capable of display in 2 or 1 columns. The third content module 430 may have a priority of 3 and be cable of display in 4, 3, 2, or 1 columns. The fourth content module 440 may have a priority of 5 and be capable of display in 3 or 1 columns.

The layout 400 may be a baseline layout in which the content modules are arranged in order of priority and allocated a preferred feasible number of columns. For example, although the first content module 410 may prefer display in 8 columns, that number of columns is not feasible for a display of 6 columns, so the first content module 410 may be allocated 4 columns. The second content module 420 may be allocated the preferred number of 2 columns and may be placed in the two columns remaining in the first row. The third content module 430 may be allocated the preferred number of 4 columns and be placed in the second row. The fourth content module 440 may be allocated the preferred number of 3 columns and placed in the third row because the 3 column width does not fit in the 2 remaining columns of the second row. The scoring engine 158 may determine a relatively low score for the layout 400 based on the unused space. In an example scoring method, a score for each individual module may be 0 because each module receives the feasible preferred number of columns. The layout 400, however, may be penalized due to unused columns. For example, the second row has 2 unused columns and the third row has 3 unused columns. In an example first scoring method wherein each unused column is weighted evenly, the layout 400 may receive a score of 5. In another example second scoring method using weights based on rows, each empty columns in the second row may be assigned a score of ½ and each empty column in the third row may be assigned a score of ⅓, for a total score of 2.

The example layout 500 may be a first variation of the layout 400. For example, the scoring engine 158 may create the variation by changing a number of columns allocated to a lowest priority content module, e.g., the fourth content module 440. For instance, the fourth content module 440 may be allocated its second highest preferred width of 1 column, which results in the fourth content module 440 being moved into an empty column of the second row. The scoring engine 158 may determine an individual score for each content module, where only the fourth content module 440 is penalized because the preferred width is not allocated. Accordingly, the module score may be, for example, ⅕ based on the low priority of the fourth content module 440. Under the first scoring method, the 1 empty column in row 2 may result in a score of 1 for a total score of 6/5. Under the second scoring method, the 1 empty column in row 2 may result in a score of ½ for a total score of 7/10. In either case, the layout 500 may have a better score than the layout 400.

The example layout 600 may be a second variation of the layout 400. For example, the scoring engine 158 may create the variation by changing the number of columns allocated to the third content module 430, for example, based on empty columns in the same row as the third content module 430. The scoring engine 158 may determine an individual score for each content module, where only the third content module 430 is penalized because the preferred width is not allocated. The fourth content module 440 may be allocated the preferred 3 columns in this layout 600. Accordingly, the module score may be, for example, ⅓ based on the priority of the third content module 430. Since the layout 600 has no empty columns, no score may be penalized for empty columns, so the total score of layout 600 may be ⅓. Therefore, the layout 600 may have the lowest score of the example layouts and may be selected.

Figure 7:
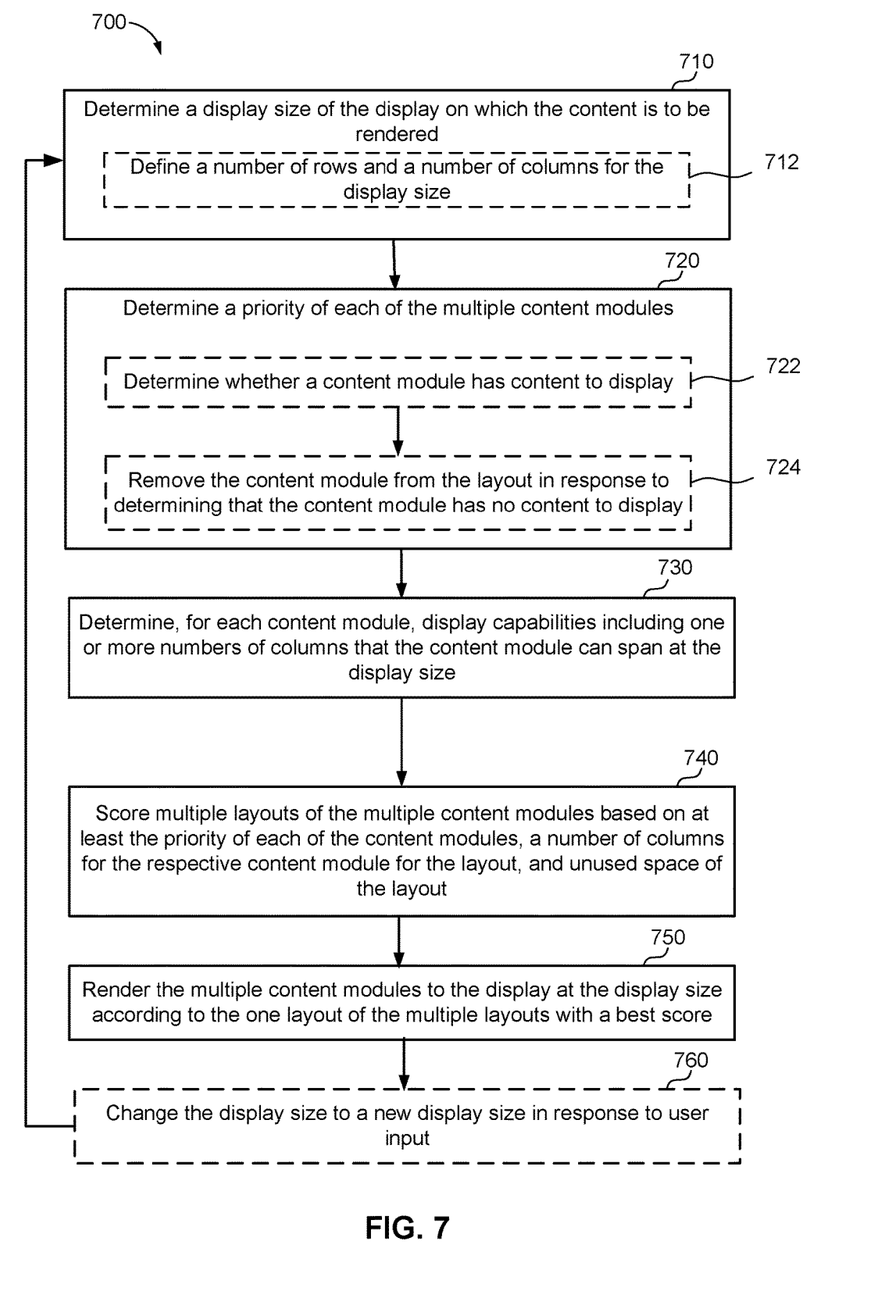
FIG. 7 is a flowchart of an example method of displaying content modules in accordance with an implementation of the present disclosure.

Turning to FIG. 7, an example method 700 displays content modules on a computer display. For example, method 700 may be performed by the layout controller 150 of the operating system 140 on the computer device 110.

At 710, the method 700 may include determining a display size of the display on which the content is to be rendered. For instance, sizing component 152 may determine a display size of the display 120 on which the content is to be rendered. The sizing component 152 may communicate with the display controller 142 to determine a total display size of the display 120. The sizing component 152 may also communicate with the operating system 140 to determine a window or other portion of the display area allocated to an application 130 to be displayed. In an implementation, at 712, the action 710 may optionally include defining a number of rows and a number of columns for the display size. The number of columns may be based on a width of the display size. For example, the width may be divided by a minimum column size to determine the number of columns. The number of rows may be based on the height of the display size. The end layout may be scrollable to allow viewing of rows that do not fit in the number of rows to be displayed. In an implementation, if a layout has been cashed for the display size or the number of columns, the cached layout may be selected, and the method 700 may proceed directly to action 750.

At 720, the method 700 may include determining a priority of each of the multiple content modules. For instance, in an implementation, the layout controller 150 may execute the priority component 154 to determine a priority of each of the multiple content modules 132. For example, the priority component 154 may communicate with each content module to determine the priority. At 722, the action 720 may include determining whether a content module has content to display. For example, the priority component 154 may receive an indication of whether the content module has information to display in addition to the priority. For example, some content modules may include live content based on connectivity to a network. If the network connection is not available or the network provides no content to display, the content module 132 may report that the content module 132 is empty. At 724, the action 720 may include removing the content module from the layout in response to determining that the content module has no content to display. For example, the priority component 154 may remove the content module 132 from the layout in response to determining that the content module has no content to display. In an implementation, a content module with no content to display may be assigned a priority of 0, indicating that the content module should not be displayed.

At 730, the method 700 may include determining, for each content module, display capabilities including one or more numbers of columns that the content module can span at the display size. In an implementation, for example, the layout controller 150 may execute the capability component 156 to determine, for each content module 132, display capabilities 134 including one or more numbers of columns that the content module can span at the display size. The capability component 156 may communicate with the content modules 132 to determine the display capabilities 134. For example, each content module 132 may provide list of numbers of columns in which the content module 132 is capable of display. The list may be ordered according to preference, which may be pre-determined by a human designer based on the content.

At 740, the method 700 may include scoring each layout of a first set of multiple layouts of the multiple content modules, the score based on at least the priority of each of the content modules in the layout, a number of columns for each respective content module in the layout, and unused space of the layout. For instance, the layout controller 150 may execute the scoring engine 158 to score each layout of a first set of multiple layouts 400, 500, 600 of the multiple content modules 132. The score for each layout 400, 500, 600 may be based at least on the priority of each of the content modules, a number of columns for the respective content module for the layout, and unused space of the layout. For example, the scoring engine 158 may score each layout as discussed above with respect to FIGS. 4, 5, and 6.

At 750, the method 700 may include generating instructions for rendering the multiple content modules to the display at the display size according to the one layout of the multiple layouts with a best score. For example, the layout controller 150 may execute the rendering component 136 of each content module 132 to generate instructions for rendering the respective content module at the display size according to the one layout of the multiple layouts with the best score. For example, the layout controller 150 may communicate the number of columns and the layout position to each content module 132, and the respective rendering component 136 may provide instructions for rendering an image to the display controller 142.

At 760, the method 700 may optionally include changing the display size to a new display size in response to user input. For example, the operating system 140 may change the display size to a new display size in response to user input. For example, if the user resizes a window for an application 130, the operating system 140 may change the display size. The layout controller 150 may cache the one layout for the display size in association with the display size in case the display size is later reselected by the user. The method 700 may return to action 710 to determine a layout for the new display size.

Figure 8:
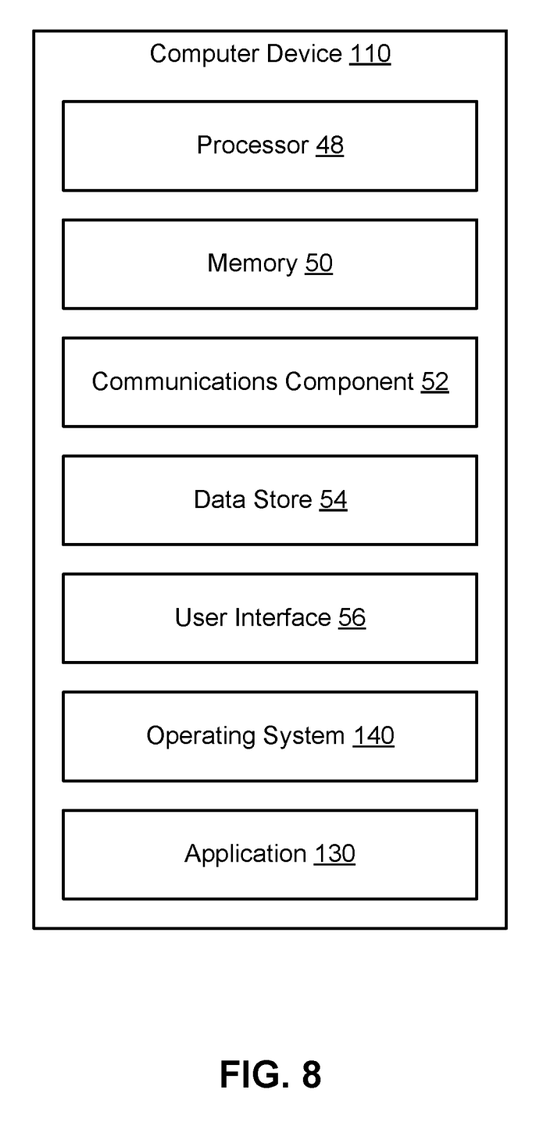
FIG. 8 is a schematic block diagram of an example computer device in accordance with an implementation of the present disclosure.

Referring now to FIG. 8, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 130. In addition, processor 48 may execute operating system 140 and/or application 130, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device for displaying content including multiple content modules, comprising:
    a display;
    a memory; and
    at least one processor configured to:
        determine a display size of the display on which the content is to be rendered;
        determine a priority of each of the multiple content modules;
        determine, for each content module, display capabilities including one or more numbers of columns that the content module can span at the display size;
        score each layout of a first set of multiple layouts of the multiple content modules, the score based on at least the priority of each of the content modules in the layout, a number of columns for each respective content module in the layout, and unused space of the layout; and
        generate instructions for rendering the multiple content modules to the display at the display size according to the one layout of the multiple layouts with a best score.

2. The computer device of claim 1, wherein the processor is configured to define a number of rows and the number of columns for the display size.

3. The computer device of claim 1, wherein the processor is configured to:
    determine whether a content module of the multiple content modules has content to display; and
    remove the content module from the layout in response to determining that the content module has no content to display.

4. The computer device of claim 1, wherein the processor is configured to:
    change the display size to a new display size in response to user input;
    score a second set of multiple layouts based on the new display size; and
    render the multiple content modules to the display at the new display size.

5. The computer device of claim 4, wherein the processor is configured to cache the one layout of the first set of multiple layouts with the best score in association with the display size in response to changing the display size and render the one layout in response to the display size being reselected.

6. The computer device of claim 1, wherein at least one of the multiple content modules includes a content element, wherein the processor is configured to determine a size of the content element based on a rendering size of the content module in the one layout of the first set of multiple layouts with the best score.

7. The computer device of claim 1, wherein the processor is configured to communicate a respective rendering size to each of the multiple content modules, and wherein each content module renders the content of the content module based on the rendering size.

8. The computer device of claim 1, wherein the processor is configured to score the multiple layouts of the multiple content modules by:
    generating a baseline layout according to a preferred number of columns for each content module with the multiple content modules arranged in order of priority;
    determine a score for the baseline layout based on at least unused space for the baseline layout;
    modify the baseline layout to create an alternative layout; and
    determine a score for the alternative layout based on at least unused space for the alternative layout.

9. The computer device of claim 8, wherein the processor is further configured to score the multiple layouts of the multiple content modules by modifying the alternative layout to generate a second alternative layout if the score for the alternative layout is better than the score for the baseline layout.

10. The computer device of claim 1, wherein the best score has a lowest value among scores for the first set of multiple layouts.

11. A method for rendering multiple content modules on a computer display, comprising:

determining a display size on which content is to be rendered;

determining a priority of each of the multiple content modules;

determining, for each content module, display capabilities including one or more numbers of columns that the content module can span at the display size;

scoring each layout of a first set of multiple layouts of the multiple content modules, the score based on at least the priority of each of the content modules in the layout, a number of columns for each respective content module in the layout, and unused space of the layout; and generating instructions for rendering the multiple content modules to the computer display at the display size according to the one layout of the multiple layouts with a best score.

12. The method of claim 11, wherein determining a display size comprises defining a number of rows and the number of columns for the display size.

13. The method of claim 11, further comprising:

determining whether a content module of the multiple content modules has content to display; and removing the content module from the layout in response to determining that the content module has no content to display.

14. The method of claim 11, further comprising:

changing the display size to a new display size in response to user input;

scoring a second set of multiple layouts based on the new display size; and rendering the multiple content modules to the computer display at the new display size.

15. The method of claim 14, further comprising:

caching the one layout of the first set of multiple layouts with the best score in association with the display size in response to changing the display size; and rendering the one layout in response to the display size being reselected.

16. The method of claim 11, wherein at least one of the multiple content modules includes a content element, further comprising determining a size of the content element based on a rendering size of the content module in the one layout of the first set of multiple layouts with the best score.

17. The method of claim 11, wherein generating the instructions for rendering comprises communicating a respective rendering size to each of the multiple content modules, wherein each content module renders the content of the content module based on the rendering size.

18. The method of claim 11, wherein scoring the multiple layouts of the multiple content modules comprises:

generating a baseline layout according to a preferred number of columns for each content module with the multiple content modules arranged in order of priority;

determining a score for the baseline layout based on at least unused space for the baseline layout;

modifying the baseline layout to create an alternative layout; and determining a score for the alternative layout based on at least unused space for the alternative layout.

19. The method of claim 18, further comprising modifying the alternative layout to generate a second alternative layout if the score for the alternative layout is better than the score for the baseline layout.

20. The method of claim 11, wherein the best score has a lowest value among scores for the first set of multiple layouts.

* * * * *